(12) United States Patent
Sharma et al.

(10) Patent No.: US 8,170,273 B2
(45) Date of Patent: *May 1, 2012

(54) ENCODING AND DECODING AUXILIARY SIGNALS

(75) Inventors: Ravi K. Sharma, Hillsboro, OR (US); John Stach, Tualatin, OR (US)

(73) Assignee: Digimarc Corporation, Beaverton, OR (US)

(*) Notice: Subject to any disclaimer, the term of this patent is extended or adjusted under 35 U.S.C. 154(b) by 0 days.

This patent is subject to a terminal disclaimer.

(21) Appl. No.: 12/768,519

(22) Filed: Apr. 27, 2010

(65) Prior Publication Data

US 2010/0322468 A1 Dec. 23, 2010

Related U.S. Application Data

(63) Continuation of application No. 12/368,104, filed on Feb. 9, 2009, now Pat. No. 7,706,570, which is a continuation of application No. 11/383,742, filed on May 16, 2006, now Pat. No. 7,489,801, which is a continuation of application No. 10/132,060, filed on Apr. 24, 2002, now Pat. No. 7,046,819.

(60) Provisional application No. 60/286,701, filed on Apr. 25, 2001.

(51) Int. Cl.
*G06K 9/00* (2006.01)
*H04B 1/66* (2006.01)

(52) U.S. Cl. ............. 382/100; 382/236; 375/240.25

(58) Field of Classification Search .............. 382/100, 382/112, 162, 182, 169–172, 191, 232–235, 382/237, 242, 250, 260, 274, 284, 276, 294, 382/305, 236; 348/475; 360/77.08; 375/240.25; 380/54; 56/249
See application file for complete search history.

(56) References Cited

U.S. PATENT DOCUMENTS

| | | |
|---|---|---|
| 3,810,156 A | 5/1974 | Goldman |
| 3,838,444 A | 9/1974 | Loughlin et al. |
| 3,919,479 A | 11/1975 | Moon et al. |
| 3,984,624 A | 10/1976 | Waggener |
| 4,071,698 A | 1/1978 | Barger, Jr. et al. |
| 4,225,967 A | 9/1980 | Miwa et al. |
| 4,230,990 A | 10/1980 | Lert, Jr. et al. |
| 4,284,846 A | 8/1981 | Marley |
| 4,432,096 A | 2/1984 | Bunge |
| 4,450,531 A | 5/1984 | Kenyon et al. |
| 4,495,526 A | 1/1985 | Baranoff-Rossine |

(Continued)

FOREIGN PATENT DOCUMENTS

EP 161512 11/1985

(Continued)

OTHER PUBLICATIONS

Arai et al., "Retrieving Electronic Documents with Real-World Objects on InteractiveDESK." UIST '95, Nov. 14, 1995.

(Continued)

*Primary Examiner* — Seyed Azarian

(57) ABSTRACT

This disclosure describes apparatus and systems for encoding and decoding signals from a host signal such as audio, video or imagery. One claim recites an apparatus comprising: electronic memory for storing a media signal representing audio or video; and an electronic processor. The electronic processor is programmed for: extracting data representing at least some features of the media signal; using the extracted data as a key to select coefficients in a transform domain, the coefficients representing the media signal; and modifying selected coefficients to hide a steganographic signal in the media signal. Of course, other claims and combinations are provided as well.

47 Claims, 2 Drawing Sheets

U.S. PATENT DOCUMENTS

| | | | |
|---|---|---|---|
| 4,495,620 A | 1/1985 | Steele et al. |
| 4,499,601 A | 2/1985 | Matthews |
| 4,511,917 A | 4/1985 | Kohler et al. |
| 4,547,804 A | 10/1985 | Greenberg |
| 4,634,966 A | 1/1987 | Nakatani et al. |
| 4,639,779 A | 1/1987 | Greenberg |
| 4,677,466 A | 6/1987 | Lert, Jr. et al. |
| 4,682,370 A | 7/1987 | Matthews |
| 4,697,209 A | 9/1987 | Kiewit et al. |
| 4,739,398 A | 4/1988 | Thomas et al. |
| 4,776,017 A | 10/1988 | Fujimoto |
| 4,805,020 A | 2/1989 | Greenberg |
| 4,807,031 A | 2/1989 | Broughton et al. |
| 4,843,562 A | 6/1989 | Kenyon et al. |
| 4,858,000 A | 8/1989 | Lu |
| 4,888,798 A | 12/1989 | Earnest |
| 4,918,730 A | 4/1990 | Schulze |
| 4,931,871 A | 6/1990 | Kramer |
| 4,939,515 A | 7/1990 | Adelson |
| 4,945,412 A | 7/1990 | Kramer |
| 4,963,998 A | 10/1990 | Maufe |
| 4,967,273 A | 10/1990 | Greenberg |
| 4,972,471 A | 11/1990 | Gross et al. |
| 5,019,899 A | 5/1991 | Boles et al. |
| 5,023,907 A | 6/1991 | Johnson et al. |
| 5,023,929 A | 6/1991 | Call |
| 5,031,228 A | 7/1991 | Lu |
| 5,134,719 A | 7/1992 | Mankovitz |
| 5,200,822 A | 4/1993 | Bronfin et al. |
| 5,210,820 A | 5/1993 | Kenyon |
| 5,214,792 A | 5/1993 | Alwadish |
| 5,251,301 A | 10/1993 | Cook |
| 5,276,629 A | 1/1994 | Reynolds |
| 5,303,393 A | 4/1994 | Noreen et al. |
| 5,319,453 A | 6/1994 | Copriviza et al. |
| 5,319,735 A | 6/1994 | Preuss et al. |
| 5,371,551 A | 12/1994 | Logan et al. |
| 5,400,261 A | 3/1995 | Reynolds |
| 5,410,598 A | 4/1995 | Shear |
| 5,436,653 A | 7/1995 | Ellis |
| 5,437,050 A | 7/1995 | Lamb et al. |
| 5,450,490 A | 9/1995 | Jensen et al. |
| 5,461,426 A | 10/1995 | Limberg et al. |
| 5,481,294 A | 1/1996 | Thomas et al. |
| 5,486,686 A | 1/1996 | Zdybel, Jr. et al. |
| 5,491,838 A | 2/1996 | Takahisa et al. |
| 5,504,518 A | 4/1996 | Ellis et al. |
| 5,539,635 A | 7/1996 | Larson, Jr. |
| 5,564,073 A | 10/1996 | Takahisa |
| 5,572,246 A | 11/1996 | Ellis et al. |
| 5,572,653 A | 11/1996 | DeTemple et al. |
| 5,574,519 A | 11/1996 | Manico et al. |
| 5,574,962 A | 11/1996 | Fardeau et al. |
| 5,577,249 A | 11/1996 | Califano |
| 5,577,266 A | 11/1996 | Takahisa et al. |
| 5,579,124 A | 11/1996 | Aijala et al. |
| 5,579,537 A | 11/1996 | Takahisa |
| 5,581,658 A | 12/1996 | O'Hagan et al. |
| 5,581,800 A | 12/1996 | Fardeau et al. |
| 5,584,070 A | 12/1996 | Harris et al. |
| 5,612,729 A | 3/1997 | Ellis et al. |
| 5,612,943 A | 3/1997 | Moses et al. |
| 5,613,004 A | 3/1997 | Cooperman et al. |
| 5,621,454 A | 4/1997 | Ellis et al. |
| 5,629,980 A | 5/1997 | Stefik et al. |
| 5,636,292 A | 6/1997 | Rhoads |
| 5,640,193 A | 6/1997 | Wellner |
| 5,646,997 A | 7/1997 | Barton |
| 5,661,787 A | 8/1997 | Pocock |
| 5,663,766 A | 9/1997 | Sizer, II |
| 5,671,267 A | 9/1997 | August et al. |
| 5,708,478 A | 1/1998 | Tognazzini |
| 5,721,788 A | 2/1998 | Powell et al. |
| 5,721,827 A | 2/1998 | Logan et al. |
| 5,732,216 A | 3/1998 | Logan et al. |
| 5,737,025 A | 4/1998 | Dougherty et al. |
| 5,740,244 A | 4/1998 | Indeck |
| 5,751,854 A | 5/1998 | Saitoh et al. |
| 5,761,606 A | 6/1998 | Wolzien |
| 5,765,152 A | 6/1998 | Erickson |
| 5,765,176 A | 6/1998 | Bloomberg |
| 5,774,452 A | 6/1998 | Wolosewicz |
| 5,774,664 A | 6/1998 | Hidary et al. |
| 5,778,192 A | 7/1998 | Schuster et al. |
| 5,781,914 A | 7/1998 | Stork et al. |
| 5,806,031 A | 9/1998 | Fineberg |
| 5,815,709 A | 9/1998 | Waldo et al. |
| 5,822,432 A | 10/1998 | Moskowitz et al. |
| 5,822,436 A * | 10/1998 | Rhoads ........................ 380/54 |
| 5,822,966 A * | 10/1998 | Snell ........................... 56/249 |
| 5,832,119 A | 11/1998 | Rhoads |
| 5,835,639 A | 11/1998 | Honsinger et al. |
| 5,841,978 A | 11/1998 | Rhoads |
| 5,842,162 A | 11/1998 | Fineberg |
| 5,845,281 A | 12/1998 | Benson et al. |
| 5,857,038 A | 1/1999 | Owada et al. |
| 5,859,920 A | 1/1999 | Daly et al. |
| 5,862,260 A | 1/1999 | Rhoads |
| 5,875,249 A | 2/1999 | Mintzer et al. |
| 5,889,868 A | 3/1999 | Moskowitz et al. |
| 5,892,536 A | 4/1999 | Logan et al. |
| 5,892,900 A | 4/1999 | Ginter et al. |
| 5,893,095 A | 4/1999 | Jain et al. |
| 5,901,224 A | 5/1999 | Hecht |
| 5,902,353 A | 5/1999 | Reber et al. |
| 5,903,892 A | 5/1999 | Hoffert et al. |
| 5,905,248 A | 5/1999 | Russell et al. |
| 5,905,800 A | 5/1999 | Moskowitz et al. |
| 5,915,019 A | 6/1999 | Ginter et al. |
| 5,915,027 A | 6/1999 | Cox et al. |
| 5,918,223 A | 6/1999 | Blum et al. |
| 5,930,369 A | 7/1999 | Cox et al. |
| 5,932,863 A | 8/1999 | Rathus |
| 5,937,000 A | 8/1999 | Lee et al. |
| 5,938,727 A | 8/1999 | Ikeda |
| 5,940,135 A | 8/1999 | Petrovic |
| 5,943,422 A | 8/1999 | Van Wie et al. |
| 5,945,932 A | 8/1999 | Smith |
| 5,949,055 A | 9/1999 | Fleet et al. |
| 5,974,548 A | 10/1999 | Adams |
| 5,978,791 A | 11/1999 | Farber et al. |
| 5,982,956 A | 11/1999 | Lahmi |
| 5,983,176 A | 11/1999 | Hoffert et al. |
| 5,986,651 A | 11/1999 | Reber et al. |
| 5,986,692 A | 11/1999 | Logan et al. |
| 5,987,509 A | 11/1999 | Portuesi |
| 5,988,897 A | 11/1999 | Pierce et al. |
| 5,991,500 A | 11/1999 | Kanota et al. |
| 5,991,737 A | 11/1999 | Chen |
| 5,991,876 A | 11/1999 | Johnson et al. |
| 5,995,105 A | 11/1999 | Reber et al. |
| 5,999,224 A | 12/1999 | Maeda et al. |
| 6,002,443 A | 12/1999 | Iggulden |
| 6,011,857 A | 1/2000 | Sowell et al. |
| 6,021,432 A | 2/2000 | Sizer, II et al. |
| 6,028,960 A | 2/2000 | Graf et al. |
| 6,044,182 A | 3/2000 | Daly et al. |
| 6,058,430 A | 5/2000 | Kaplan |
| 6,061,719 A | 5/2000 | Bendinelli et al. |
| 6,064,764 A | 5/2000 | Bhaskaran et al. |
| 6,065,119 A | 5/2000 | Sandford, II et al. |
| 6,075,568 A | 6/2000 | Matsuura |
| 6,076,734 A | 6/2000 | Dougherty et al. |
| 6,081,629 A | 6/2000 | Browning |
| 6,081,827 A | 6/2000 | Reber et al. |
| 6,081,830 A | 6/2000 | Schindler |
| 6,084,528 A | 7/2000 | Beach et al. |
| 6,088,455 A | 7/2000 | Logan et al. |
| 6,098,106 A | 8/2000 | Philyaw et al. |
| 6,108,434 A | 8/2000 | Cox et al. |
| 6,121,530 A | 9/2000 | Sonoda |
| 6,122,403 A * | 9/2000 | Rhoads ........................ 382/233 |
| 6,138,151 A | 10/2000 | Reber et al. |
| 6,145,081 A | 11/2000 | Winograd et al. |
| 6,157,721 A | 12/2000 | Shear et al. |
| 6,164,534 A | 12/2000 | Rathus et al. |
| 6,169,541 B1 | 1/2001 | Smith |

| Patent | Date | Name |
|---|---|---|
| 6,181,817 B1 | 1/2001 | Zabih |
| 6,182,018 B1 | 1/2001 | Tran et al. |
| 6,182,218 B1 | 1/2001 | Saito |
| 6,185,316 B1 | 2/2001 | Buffam |
| 6,185,683 B1 | 2/2001 | Ginter et al. |
| 6,199,048 B1 | 3/2001 | Hudetz et al. |
| 6,199,076 B1 | 3/2001 | Logan et al. |
| 6,201,879 B1 | 3/2001 | Bender et al. |
| 6,219,787 B1 | 4/2001 | Brewer |
| 6,240,121 B1 | 5/2001 | Senoh |
| 6,243,480 B1 | 6/2001 | Zhao |
| 6,272,176 B1 | 8/2001 | Srinivasan |
| 6,272,634 B1 | 8/2001 | Tewfik et al. |
| 6,278,781 B1 | 8/2001 | Rhoads |
| 6,282,299 B1 | 8/2001 | Tewfik et al. |
| 6,282,362 B1 | 8/2001 | Murphy et al. |
| 6,286,036 B1 | 9/2001 | Rhoads |
| 6,298,142 B1 | 10/2001 | Nakano et al. |
| 6,304,523 B1 | 10/2001 | Jones et al. |
| 6,311,214 B1 | 10/2001 | Rhoads |
| 6,314,457 B1 | 11/2001 | Schena et al. |
| 6,317,881 B1 | 11/2001 | Shah-Nazaroff et al. |
| 6,321,992 B1 | 11/2001 | Knowles et al. |
| 6,324,573 B1 | 11/2001 | Rhoads |
| 6,345,104 B1 | 2/2002 | Rhoads |
| 6,385,329 B1 | 5/2002 | Sharma et al. |
| 6,386,453 B1 | 5/2002 | Russell et al. |
| 6,389,055 B1 | 5/2002 | August et al. |
| 6,400,826 B1 * | 6/2002 | Chen et al. ............... 382/100 |
| 6,404,926 B1 | 6/2002 | Miyahara et al. |
| 6,408,082 B1 | 6/2002 | Rhoads et al. |
| 6,408,331 B1 | 6/2002 | Rhoads |
| 6,411,725 B1 | 6/2002 | Rhoads |
| 6,415,280 B1 | 7/2002 | Farber et al. |
| 6,424,725 B1 | 7/2002 | Rhoads et al. |
| 6,425,081 B1 | 7/2002 | Iwamura |
| 6,427,012 B1 | 7/2002 | Petrovic |
| 6,433,946 B2 | 8/2002 | Ogino |
| 6,434,561 B1 | 8/2002 | Durst, Jr. et al. |
| 6,439,465 B1 | 8/2002 | Bloomberg |
| 6,449,367 B2 | 9/2002 | Van Wie et al. |
| 6,466,670 B1 | 10/2002 | Tsuria et al. |
| 6,483,927 B2 * | 11/2002 | Brunk et al. ............... 382/100 |
| 6,487,301 B1 | 11/2002 | Zhao |
| 6,496,802 B1 | 12/2002 | van Zoest et al. |
| 6,505,160 B1 | 1/2003 | Levy et al. |
| 6,512,837 B1 * | 1/2003 | Ahmed ............... 382/100 |
| 6,516,079 B1 | 2/2003 | Rhoads et al. |
| 6,522,769 B1 | 2/2003 | Rhoads et al. |
| 6,523,175 B1 | 2/2003 | Chan |
| 6,526,449 B1 | 2/2003 | Philyaw et al. |
| 6,542,927 B2 | 4/2003 | Rhoads |
| 6,542,933 B1 | 4/2003 | Durst, Jr. et al. |
| 6,546,418 B2 | 4/2003 | Ritz et al. |
| 6,553,129 B1 | 4/2003 | Rhoads |
| 6,571,144 B1 | 5/2003 | Moses et al. |
| 6,574,594 B2 | 6/2003 | Pitman et al. |
| 6,577,746 B1 | 6/2003 | Evans et al. |
| 6,577,747 B1 | 6/2003 | Kalker et al. |
| 6,614,914 B1 | 9/2003 | Rhoads |
| 6,657,117 B2 | 12/2003 | Weare et al. |
| 6,658,568 B1 | 12/2003 | Ginter et al. |
| 6,671,388 B1 | 12/2003 | Op De Beeck et al. |
| 6,674,876 B1 | 1/2004 | Hannigan et al. |
| 6,674,993 B1 | 1/2004 | Tarbouriech |
| 6,681,028 B2 | 1/2004 | Rodriguez et al. |
| 6,683,966 B1 * | 1/2004 | Tian et al. ............... 382/100 |
| 6,697,948 B1 | 2/2004 | Rabin et al. |
| 6,718,047 B2 | 4/2004 | Rhoads |
| 6,748,360 B2 | 6/2004 | Pitman et al. |
| 6,748,533 B1 | 6/2004 | Wu |
| 6,753,883 B2 | 6/2004 | Schena et al. |
| 6,768,980 B1 | 7/2004 | Meyer et al. |
| 6,771,885 B1 | 8/2004 | Agnihotri |
| 6,772,124 B2 | 8/2004 | Hoffberg et al. |
| 6,775,392 B1 * | 8/2004 | Rhoads ............... 382/100 |
| 6,807,534 B1 | 10/2004 | Erickson |
| 6,813,369 B2 | 11/2004 | Oki |
| 6,829,368 B2 | 12/2004 | Meyer et al. |
| 6,834,308 B1 | 12/2004 | Ikezoye |
| 6,850,252 B1 | 2/2005 | Hoffberg |
| 6,856,977 B1 | 2/2005 | Adelsbach |
| 6,880,082 B2 | 4/2005 | Ohta |
| 6,925,342 B2 | 8/2005 | Hars |
| 6,931,451 B1 | 8/2005 | Logan et al. |
| 6,934,114 B1 | 8/2005 | Codilian et al. |
| 6,941,275 B1 | 9/2005 | Swierczek |
| 6,948,068 B2 | 9/2005 | Lawandy et al. |
| 6,952,486 B2 | 10/2005 | Yamakage et al. |
| 6,954,540 B2 | 10/2005 | Maeno |
| 6,965,682 B1 | 11/2005 | Davis et al. |
| 6,968,337 B2 | 11/2005 | Wold |
| 6,970,886 B1 | 11/2005 | Conwell et al. |
| 6,973,574 B2 | 12/2005 | Mihcak et al. |
| 6,973,669 B2 | 12/2005 | Daniels |
| 6,975,746 B2 | 12/2005 | Davis et al. |
| 6,983,051 B1 | 1/2006 | Rhoads |
| 6,987,862 B2 | 1/2006 | Rhoads |
| 6,990,453 B2 | 1/2006 | Wang |
| 7,035,867 B2 | 4/2006 | Thompson et al. |
| 7,046,819 B2 | 5/2006 | Sharma et al. |
| 7,047,406 B2 | 5/2006 | Schleicher et al. |
| 7,047,413 B2 | 5/2006 | Yacobi et al. |
| 7,050,603 B2 | 5/2006 | Rhoads et al. |
| 7,058,223 B2 | 6/2006 | Cox |
| 7,058,697 B2 | 6/2006 | Rhoads |
| 7,062,069 B2 | 6/2006 | Rhoads |
| 7,085,613 B2 | 8/2006 | Pitman et al. |
| 7,099,495 B2 | 8/2006 | Kodno et al. |
| 7,107,451 B2 | 9/2006 | Moskowitz |
| 7,107,452 B2 | 9/2006 | Serret-Avila et al. |
| 7,116,717 B1 | 10/2006 | Eshet et al. |
| 7,116,781 B2 | 10/2006 | Rhoads |
| 7,127,744 B2 | 10/2006 | Levy |
| 7,159,121 B2 | 1/2007 | Takaragi |
| 7,162,642 B2 | 1/2007 | Schumann et al. |
| 7,174,293 B2 | 2/2007 | Kenyon et al. |
| 7,185,201 B2 | 2/2007 | Rhoads |
| 7,206,820 B1 | 4/2007 | Rhoads et al. |
| 7,289,643 B2 | 10/2007 | Brunk et al. |
| 7,302,574 B2 | 11/2007 | Conwell et al. |
| 7,369,677 B2 | 5/2008 | Petrovic et al. |
| 7,489,801 B2 | 2/2009 | Sharma et al. |
| 7,519,819 B2 | 4/2009 | Bradley et al. |
| 7,606,366 B2 | 10/2009 | Petrovic |
| 7,616,777 B2 | 11/2009 | Rodriguez et al. |
| 7,643,649 B2 | 1/2010 | Davis et al. |
| 7,706,570 B2 | 4/2010 | Sharma et al. |
| 7,711,564 B2 | 5/2010 | Levy et al. |
| 7,886,151 B2 | 2/2011 | Delp et al. |
| 7,930,546 B2 | 4/2011 | Rhoads et al. |
| 7,945,781 B1 | 5/2011 | Rhoads |
| 7,992,003 B2 | 8/2011 | Rhoads |
| 2001/0011233 A1 | 8/2001 | Narayanaswami |
| 2001/0029580 A1 | 10/2001 | Moskowitz |
| 2001/0032312 A1 | 10/2001 | Runje et al. |
| 2001/0044824 A1 | 11/2001 | Hunter et al. |
| 2001/0051915 A1 | 12/2001 | Ueno et al. |
| 2001/0055391 A1 | 12/2001 | Jacobs |
| 2002/0010826 A1 | 1/2002 | Takahashi et al. |
| 2002/0021721 A1 | 2/2002 | Jiang et al. |
| 2002/0028000 A1 | 3/2002 | Conwell et al. |
| 2002/0040433 A1 | 4/2002 | Kondo |
| 2002/0048224 A1 | 4/2002 | Dygert |
| 2002/0052885 A1 | 5/2002 | Levy |
| 2002/0059208 A1 | 5/2002 | Abe et al. |
| 2002/0059580 A1 | 5/2002 | Kalker et al. |
| 2002/0069107 A1 | 6/2002 | Werner |
| 2002/0072982 A1 | 6/2002 | Barton |
| 2002/0072989 A1 | 6/2002 | Van de Sluis |
| 2002/0083123 A1 | 6/2002 | Freedman et al. |
| 2002/0087885 A1 | 7/2002 | Peled |
| 2002/0088336 A1 | 7/2002 | Stahl |
| 2002/0097873 A1 | 7/2002 | Petrovic |
| 2002/0102966 A1 | 8/2002 | Lev et al. |
| 2002/0114491 A1 | 8/2002 | Sharma et al. |
| 2002/0126872 A1 | 9/2002 | Brunk et al. |
| 2002/0133499 A1 | 9/2002 | Ward et al. |

| | | | |
|---|---|---|---|
| 2002/0150165 | A1 | 10/2002 | Huizer |
| 2002/0152388 | A1 | 10/2002 | Linnartz et al. |
| 2002/0153661 | A1 | 10/2002 | Brooks et al. |
| 2002/0161741 | A1 | 10/2002 | Wang et al. |
| 2002/0168082 | A1 | 11/2002 | Razdan |
| 2002/0174431 | A1 | 11/2002 | Bowman et al. |
| 2002/0178410 | A1 | 11/2002 | Haitsma et al. |
| 2003/0018709 | A1 | 1/2003 | Schrempp et al. |
| 2003/0028796 | A1 | 2/2003 | Roberts et al. |
| 2003/0037010 | A1 | 2/2003 | Schmelzer |
| 2003/0051252 | A1 | 3/2003 | Miyaoku |
| 2003/0086587 | A1 | 5/2003 | Haitsma et al. |
| 2003/0120679 | A1 | 6/2003 | Kriechbaum et al. |
| 2003/0135623 | A1 | 7/2003 | Schrempp et al. |
| 2003/0167173 | A1 | 9/2003 | Levy et al. |
| 2003/0174861 | A1 | 9/2003 | Levy et al. |
| 2003/0197054 | A1 | 10/2003 | Eunson |
| 2004/0049540 | A1 | 3/2004 | Wood |
| 2004/0145661 | A1 | 7/2004 | Murakami et al. |
| 2004/0169892 | A1 | 9/2004 | Yoda |
| 2004/0201676 | A1 | 10/2004 | Needham |
| 2004/0223626 | A1 | 11/2004 | Honsinger et al. |
| 2005/0043018 | A1 | 2/2005 | Kawamoto |
| 2005/0058319 | A1 | 3/2005 | Rhoads et al. |
| 2005/0108242 | A1 | 5/2005 | Kalker et al. |
| 2005/0144455 | A1 | 6/2005 | Haitsma |
| 2005/0229107 | A1 | 10/2005 | Hull et al. |
| 2005/0267817 | A1 | 12/2005 | Barton et al. |
| 2007/0031000 | A1 | 2/2007 | Rhoads et al. |
| 2007/0072982 | A1 | 3/2007 | Choi et al. |

FOREIGN PATENT DOCUMENTS

| | | |
|---|---|---|
| EP | 464328 | 1/1992 |
| EP | 493091 | 7/1992 |
| EP | 581317 | 2/1994 |
| EP | 649074 | 4/1995 |
| EP | 901282 | 3/1999 |
| EP | 953938 | 11/1999 |
| EP | 0967803 | 12/1999 |
| EP | 1173001 | 1/2002 |
| EP | 1199878 | 4/2002 |
| JP | 11265396 | 9/1999 |
| JP | 11272287 | 10/1999 |
| WO | WO94/00842 | 1/1994 |
| WO | WO97/33273 | 9/1997 |
| WO | WO97/41683 | 11/1997 |
| WO | WO97/43736 | 11/1997 |
| WO | WO98/03923 | 1/1998 |
| WO | WO98/20675 | 5/1998 |
| WO | WO98/36372 | 8/1998 |
| WO | WO98/43237 | 10/1998 |
| WO | WO99/18723 | 4/1999 |
| WO | WO99/35809 | 7/1999 |
| WO | WO99/41900 | 8/1999 |
| WO | WO99/48099 | 9/1999 |
| WO | WO99/57623 | 11/1999 |
| WO | WO00/58940 | 10/2000 |
| WO | WO00/70585 | 11/2000 |
| WO | WO00/79709 | 12/2000 |
| WO | WO 01/01331 | 1/2001 |
| WO | WO01/15021 | 3/2001 |
| WO | WO01/20483 | 3/2001 |
| WO | WO01/20609 | 3/2001 |
| WO | WO01/35676 | 5/2001 |
| WO | WO01/62004 | 8/2001 |
| WO | WO01/71517 | 9/2001 |
| WO | WO0172030 | 9/2001 |
| WO | WO01/75629 | 10/2001 |
| WO | WO0175794 | 10/2001 |
| WO | WO02/11123 | 2/2002 |
| WO | WO0219589 | 3/2002 |
| WO | WO02/27600 | 4/2002 |
| WO | WO02082271 | 10/2002 |

OTHER PUBLICATIONS

Arai, InteractiveDESK; A Computer-Augmented Desk Which Responds to Operations on Real Objects, CHI 95, May 7, 1995.

Aust. D., "Augmenting Paper Documents with Digital Information in a Mobile Environment," MS Thesis, University of Dortmund, Department of Computer Graphics, Sep. 3, 1996.

Bender, "Techniques for Data Hiding", IBM Systems Journal, vol. 35, Nos. 3.&4, 1996, pp. 313-336.

Depovere, et al., "The VIVA Project: Digital Watermarking for Broadcast Monitoring," 1999 IEEE, pp. 202-205.

Feb. 22, 2007 Amendment and Sep. 22, 2006 Office Action, each from assignee's U.S. Appl. No. 10/338,031 (published as US 2003-0174861 A1).

Ghias et al, Query by Humming: Musical Information Retrieval In An Audio Database. In ACM Multimedia, pp. 231-236, Nov. 1995.

Haitsma, "Audio Watermarking for Monitoring and Copy Protection", Philips Research Laboratories, pp. 119-122.

Hartung, et al., "Watermarking of uncompressed and compressed video," Signal Processing, vol. 66, No. 3, pp. 283-301, May 1998.

Hartung et al., Digital Watermarking of Raw and Compressed Video, Proc. SPIE 2952, Digital Compression Technologies and Systems for Video Communications, Oct. 1996, 9 pages.

Koch, "Copyright Protection for Multimedia Data," in Proc. of the Int'l Conf. on Digital Media and Electronic Publishing (Leeds, UK, Dec. 6-8, 1994), 15 pages.

Kageyama et al, Melody Retrieval with Humming, Proceedings of Int. Computer Music Conference (ICMC), 1993.

Kim, W.G et al., "A watermarking Scheme for Both Spatial and Frequency Domain to Extract te Seal Image Without the Original Image," Proc. 5.sup.th Int. Symp. on Signal Processing and its Applications, Aug. 1999, pp. 293-296.

Kutter, "Watermark Resisting to Translation, Rotation, and Scaling", Part of the SPIE Conference on Multimedia Systems and Applications, SPIE vol. 3528, Nov. 1998, pp. 423-431.

Lin, et al., "Generating Robust Digital Signature for Imagee/Video Authentication," Proc., Multimedia and Security workshop at ACM Multimedia '98, Sep. 1, 1998, pp. 49-54.

Lu et al., "Highly Robust Image Watermaking Using Complementary Modulations," Proc. 2.sup.nd Information Security Workshop, LNCS vol. 1729. Nov. 1999, pp. 136-153.

May 18, 2007 Notice of Allowance; Apr. 17, 2007 Amendment Accompanying Request for Continued Examination, and Oct. 20, 2006 Office Action, all from U.S. Appl. No. 10/027,783, Brunk et al., filed Dec. 19, 2001 (published as 2002-0126872 A1).

Mintzer et al., "If One Watermark is Good. Are More Better?," Proc. IEEE Int. Conf. on Acoustics, Speech and Signal Processing. Mar. 1999. pp. 2067-2069.

Muscle Fish press release, Muscle Fish's Audio Search Technology to be Encapsulated into Informix Datablade Module, Jul. 10, 1996.

O'Ruanaidh, "Rotation, Scale and Translation Invariant Spread Spectrum Digital Image Watermarking," Signal Processing, 15 pages, May 1, 1998.

O'Runanaidh, "Rotation, Scale and Translation Invariant Digital Image Watermarking," 1997 IEEE, pp. 536-539.

Ohbuchi et al., "A Shape-Preserving Data Embedding Algorithm for NURBS Curves and Surfaces," Proc. Computer Graphics International (CGI '99), Jun. 1999, pp. 180-187.

Onishi et al., "A Method of Watermaking with Multiresolution Analysis and Pseudo Noise Sequences." Systems and Computers in Japan, vol. 29, No. 5, May 1998, pp. 11-19.

Preliminary Amendment filed Oct. 1, 2007 in assignee's U.S. Appl. No. 11/544,990 (published as US 2007-0031000 A1).

Sheng, "Experiments on Pattern Recognition Using Invariant Fourier-Mellin Descriptors," Journal of Optical Society of America, vol. 3, No. 6, pp. 771-776, 1986.

Suggested Restriction Requirement filed Oct. 1, 2007 in assignee's U.S. Appl. No. 11/544,990 (published as US 2007-0031000 A1).

U.S. Appl. No. 09/420,945, filed Oct. 19, 1999, Kenyon et al.

U.S. Appl. No. 60/155,064, filed Sep. 21, 1999, Kenyon.

U.S. Appl. No. 09/476,686, filed Dec. 30, 1999, Rhoads et al.

U.S. Appl. No. 09/511,632, filed Feb. 11, 2000, Ikezoye et al.

U.S. Appl. No. 09/531,076, filed Mar. 18, 2000, Rhoads et al.

U.S. Appl. No. 09/574,726, filed May 18, 2000, Rhoads et al,.

U.S. Appl. No. 10/032,282, filed Dec. 20, 2001, mailed on Jan. 24, 2005.

U.S. Appl. No. 11/738,973 (including specification, drawings and claims), filed Apr. 23, 2007.

U.S. Appl. No. 60/134,782, filed May 19, 1999, Rhoads.
U.S. Appl. No. 60/175,159, filed Jan. 7, 2000, Derose et al.
U.S. Appl. No. 60/178,028, filed Jan. 26, 2000, Meyer et al.
U.S. Appl. No. 60/191,778, filed Mar. 24, 2000, Ramos.
U.S. Appl. No. 60/218,824, filed Jul. 18, 2000, Kenyon et al.
U.S. Appl. No. 60/257,822, filed Dec. 21, 2000, Aggson et al.
U.S. Appl. No. 60/263,490, filed Jan. 22, 2001, Brunk et al.
U.S. Appl. No. 09/343,104, filed Jun. 29, 1999, Rodriguez et al.
U.S. Appl. No. 60/232,618, filed Sep. 14, 2000, Cox.
U.S. Appl. No. 60/257,924, filed Dec. 21, 2000, Sharma.
Wagner, "Fingerprinting," IEEE Proc. Symp. On Security and Privacy, pp. 5 pages (1983).
Voyatzis et al., "The Use of Watermarks in the Protection of Digital Multimedia Products," Proc. of the IEEE, vol. 87, No. 7, Jul. 1999, pp. 1197-1207.
Wold et al, Content-Based Classification, Search, and Retrieval of Audio, IEEE Multimedia Magazine, Fall, 1996.
Worring, "Hyperdocument Generation Using OCR and Icon Detection." Proc. 3d Int. Conf. on Doc. Analysis and Recognition, Aug. 14, 1995.
Yi et al., "Agent-Based Copyright Protection Architecture for Online Electronic Publishing." Proc. SPIE vol. 3657: Security and Watermarking of Multimedia Contents, Jan. 1999, pp. 484-493.
Zhao, "A WWW Service to Embed and Prove Digital Copyright Watermarks," Proc. of the Euro. Conf. on Multimedia Applications, Services and Techniques, May 1996, 15 pages.
Zhao, "Embedding Robust Labels into Images for Copyright Protection", Proc. Of the International Congress on Intellectual Property Rights for Specialized Information, Knowledge and New Technologies, Vienna, Austria, Aug. 21-25, 1995, 10 pages.
Cano et al., "A Review of Algorithms for Audio Fingerprinting," Dec. 2002, 5 pages.
Cognicity, Inc. Initial Offer in Response to Secure Digital Music Initiative CfP for Phase II Screening Technology submission 2, Apr. 24, 2000, 4 pages.
Cognicity's Phase II Screening Technology: Non Watermarking Solution, Powerpoint presentation, Jun. 26, 2000, 14 pages.
Hartung, et al., Watermarking of MPEG-2 encoded video without decoding and re-encoding, SPIE Vo. 3020, (1997) pp. 264-274.
Fridrich, "Visual Hash for Oblivious Watermarking," Proc. of SPIE vol. 3971, 2000, pp. 286-294.
Lamy, P. et al., "Content-Based Watermarking for Image Authentication," Proc. $3^{rd}$ Int. Workshop on Information Hiding, Sep./Oct. 1999, pp. 187-198.
Schneider, M. et al, "A Robust Content Based Digital Signature for Image Authentication," IEEE Proc. Int. Conf. on Image Processing, Sep. 1996, pp. 227-230 (vol. 3).

* cited by examiner

ENCODING AND DECODING AUXILIARY SIGNALS

TECHNICAL FIELD

The present application is a continuation of application Ser. No. 12/368,104, filed Feb. 9, 2009 (U.S. Pat. No. 7,706,570) which is a continuation of application Ser. No. 11/383,742, filed May 16, 2006 (U.S. Pat. No. 7,489,801), which is a continuation of application Ser. No. 10/132,060, filed Apr. 24, 2002 (U.S. Pat. No. 7,046,819) which claims benefit of provisional application No. 60/286,701, filed Apr. 25, 2001. Each of the above patent documents is hereby incorporated herein by reference.

BACKGROUND

Digital watermarking is a process for modifying physical or electronic media to embed a machine-readable code into the media. The media may be modified such that the embedded code is imperceptible or nearly imperceptible to the user, yet may be detected through an automated detection process. Most commonly, digital watermarking is applied to media signals such as images, audio signals, and video signals. However, it may also be applied to other types of media objects, including documents (e.g., through line, word or character shifting), software, multi-dimensional graphics models, and surface textures of objects.

Digital watermarking systems typically have two primary components: an encoder that embeds the watermark in a host media signal, and a decoder that detects and reads the embedded watermark from a signal suspected of containing a watermark (a suspect signal). The encoder embeds a watermark by altering the host media signal. The reading component analyzes a suspect signal to detect whether a watermark is present. In applications where the watermark encodes information, the reader extracts this information from the detected watermark.

Several particular watermarking techniques have been developed. The reader is presumed to be familiar with the literature in this field. Particular techniques for embedding and detecting imperceptible watermarks in media signals are detailed in the assignee's application Ser. No. 09/503,881 (now U.S. Pat. No. 6,614,914), 60/278,049 and U.S. Pat. No. 6,122,403, which are hereby incorporated by reference.

DETAILED DESCRIPTION

This disclosure describes a method for encoding a digital watermark into an image signal that is robust to geometric distortion. The digital watermark is adapted to the host image signal in which it is embedded so as to be imperceptible or substantially imperceptible in the watermarked image when displayed or printed. This digital watermark may be used to determine the geometric distortion applied to a watermarked image, may be used to carry auxiliary information, and may be used to detect and decode a digital watermark embedded in a geometrically distorted version of a watermarked image. Because of its robustness to geometric distortion, the digital watermark is useful for a number of applications for embedding auxiliary data in image signals, including still pictures and video, where the image signal is expected to survive geometric distortion.

This method may be adapted to other types of media signals such as audio.

The digital watermarking system includes an embedder and a detector. The embedder embeds the digital watermark into a host media signal so that it is substantially imperceptible. The detector reads the watermark from a watermarked signal.

Figure 1:
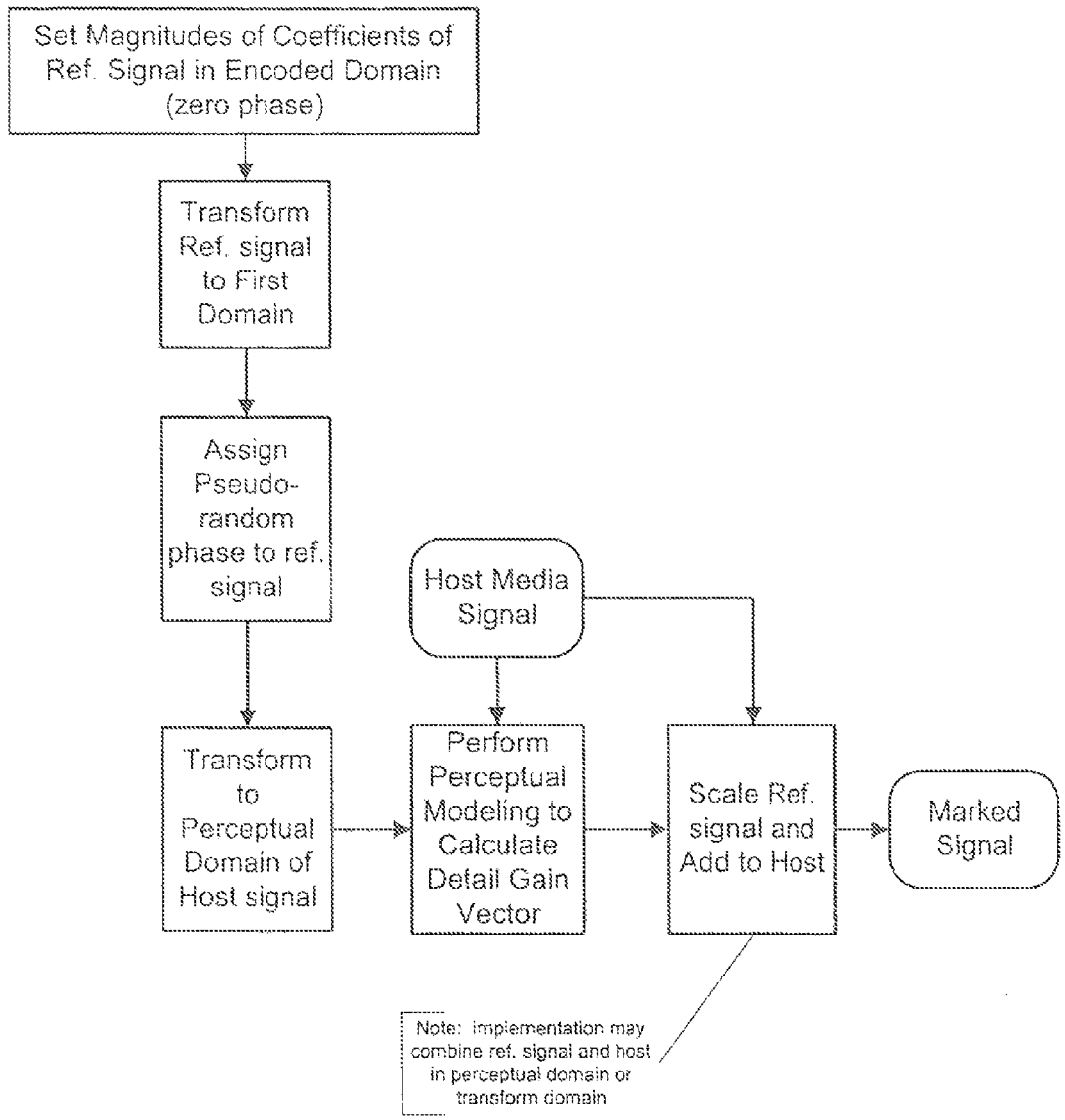
FIG. 1 is a diagram illustrating a digital watermark embedder.

FIG. 1 is a diagram illustrating a digital watermark embedder.

The embedder encodes a reference signal into a particular transform domain of the host media signal, called the encoded domain. The embedding of the reference signal may use a secret key. Also, the encoded reference signal can be embedded so that it is dependent on the host signal by using some attributes of the host signal to create the encoded reference signal. For example, a hash of attributes of the host media signal may be used as a key to encode the reference signal in the encoded domain. The hash is preferably robust to manipulation of the host signal, including changes due to embedding the digital watermark, so that it can be derived from the watermarked signal and used to decode the embedded watermark. Examples of hashes include most significant bits of image samples, low frequency components (e.g., low frequency coefficients, a low pass filtered, sub sampled and/or compressed version of the host signal or signal attributes).

The following describes a digital watermark embedder and detector for images. First, the embedder creates the reference signal in the encoded domain. The encoded domain is a transform domain of the host image. In this particular example, the relationship between the spatial domain of the host image and the encoded domain is as follows. To get from the image to the encoded domain, the image is transformed to a first domain, and then the first domain data is transformed into the encoded domain.

The embedder starts with a reference signal with coefficients of a desired magnitude in the encoded domain. These coefficients initially have zero phase. Next, the embedder transforms the signal from the encoded domain to the first transform domain to recreate the magnitudes in the first transform domain.

The selected coefficients may act as carriers of a multi-bit message. For example, in one implementation, the multi-bit message is selected from a symbol alphabet comprised of a fixed number of coefficients (e.g., 64) in the encoded domain. The embedder takes a desired message, performs error correction coding, and optional spreading over a PN sequence to produce a spread binary signal, where each element maps to 1 of the 64 coefficients. The spreading may include taking the XOR of the error correction encoded message with a PN sequence such that the resulting spread signal has roughly the same elements of value 1 as those having a value of 0. If an element in the spread signal is a binary 1, the embedder creates a peak at the corresponding coefficient location in the encoded domain. Otherwise, the embedder makes no peak at the corresponding coefficient location. Some of the coefficients may always be set to a binary 1 to assist in detecting the reference signal.

Next, the embedder assigns a pseudorandom phase to the magnitudes of the coefficients of the reference signal in the first transform domain. The phase of each coefficient can be generated by using a key number as a seed to a pseudorandom number generator, which in turn produces a phase value.

Alternatively, the pseudorandom phase values may be computed by modulating a PN sequence with an N-bit binary message.

Now, the embedder has defined the magnitude and phase of the reference signal in the first transform domain. It then transforms the reference signal from the first domain to the perceptual domain, which for images, is the spatial domain. Finally, the embedder adds the reference signal to the host image. Preferably, the embedder applies a gain factor to the reference signal that scales the reference signal to take advantage of data hiding characteristics of the host image. For examples of such gain calculations see the patent documents incorporated by reference above.

In one implementation, the first transform domain is a 2D Fourier domain computed by taking an FFT of a block of the host image. The encoded domain is computed by performing a 2D transform of the first transform domain. To create the reference signal, the magnitude of the coefficients of the encoded domain are set to desired levels. These coefficients have zero phase. This signal is then re-created in the first domain by taking the inverse FFT of the reference signal in the encoded domain. Next, the embedder sets the phase of the signal in the first domain by generating a PN sequence and mapping elements of the PN sequence to coefficient locations in the first domain. Finally, the embedder computes the inverse FFT of the signal, including its magnitude components and phase components, to get the spatial domain version of the reference signal. This spatial domain signal is scaled and then added to the host signal in the spatial domain. This process is repeated for contiguous blocks in the host image signal, such that the embedded signal is replicated across the image.

The host image and reference signal may be added in the first transform domain and then inversely transformed using in inverse FFT to the spatial domain.

The embedder may use a key to specify the magnitudes of the coefficients in the encoded domain and to generate the random phase information of the reference signal in the first transform domain. The locations and values of the coefficients of the reference signal in the encoded domain may be derived from the host image, such as by taking a hash of the host image. Also, a hash of the host image may be used to compute a key number for a pseudorandom number generator that generates the pseudorandom phase of the reference signal in the first transform domain.

The above embedding technique may be combined with other digital watermarking methods to encode auxiliary data. In this case, the reference signal is used to correct for geometric distortion. Once the geometric distortion is compensated for using the reference signal, then a message decoding technique compatible with the encoder extracts the message data. This auxiliary data may be hidden using the techniques described in the patent documents reference above or other known techniques described in digital watermarking literature.

Figure 2:
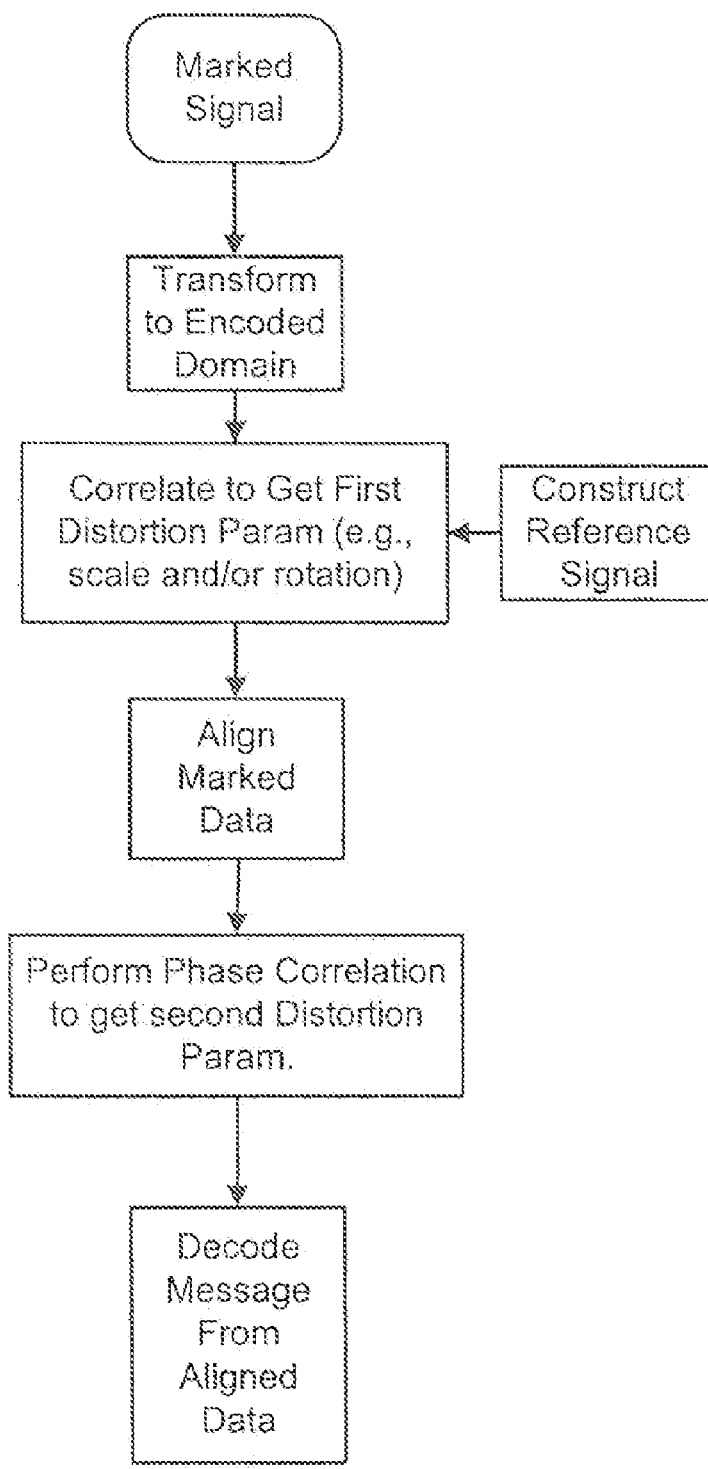
FIG. 2 is a diagram illustrating a digital watermark detector compatible with the embedder of FIG. 1.

FIG. 2 is a diagram illustrating a digital watermark detector compatible with the embedder of FIG. 1.

The detector operates on portions of a signal suspected of containing a digital watermark that has been embedded as described above. First, it creates a specification of the magnitudes of the reference signal in the encoded domain. If the magnitudes were specified by a key, the detector first reads the key or derives it from the watermarked signal. It then constructs a copy of the magnitudes of the reference signal in the encoded domain and uses it to align the watermarked image. If the magnitudes were specified by encoding an N bit message in selected ones of the 64 coefficients, then a proxy for the reference signal is created as a series of peaks at all 64 locations.

To align the watermarked image, the detector transforms the image into the first transform domain and sets the phase to zero. It then transforms the magnitudes of the watermarked image in the first domain into the encoded domain. In the encoded domain, the detector correlates the copy of the reference signal constructed from the key or N bit message with the magnitude data of the watermarked image transformed from the first domain.

The detector may use any of a variety of correlation techniques, such as matched filtering or impulse filtering, to determine affined transformation parameters (e.g., rotation, scale, differential scale, shear), except translation, based on the magnitude data in the encoded domain. Examples of some correlation techniques are provided in the patent documents referenced above. One technique is to transform the magnitude information of the reference signal and watermarked image data to a log polar space using a Fourier Mellin transform and use a generalized match filter to determine the location of the correlation peak. This peak location provides an estimate of rotation and scale.

After finding the rotation and scale, the detector aligns the watermarked image data and then correlates the phase of the aligned watermarked image with the phase of the reference signal. The detector may correlate the watermarked image data with the pseudorandom carrier signal used to create the random phase, or the random phase specification itself. In the case where the pseudorandom phase of the reference signal is created by modulating a message with a pseudorandom carrier, a part of the message may remain constant for all message payloads so that the constant part can be used to provide accurate translation parameters by phase matching the reference phase with the phase of the aligned watermarked image.

Once the watermarked image is aligned using the above techniques, message data may be decoded from the watermarked image using a message decoding scheme compatible with the embedder. In the particular case where an N bit message is encoded into the magnitude of the reference signal in the encoded domain, the message decoder analyzes the 64 coefficient locations of the watermarked data in the encoded domain and assigns them to a binary value of 1 or 0 depending on whether a peak is detected at the corresponding locations. Then, the decoder performs spread spectrum demodulation and error correction decoding (e.g., using a technique compatible with the embedder such as BCH, convolution, or turbo coding) to recover the original N bit binary message.

In the particular case where the N bit message is encoded into the pseudorandom phase information of the reference signal, the decoder correlates the phase information of the watermarked signal with the PN carrier signal to get estimates of the error correction encoded bit values. It then performs error correction decoding to recover the N bit message payload.

The same technique may be adapted for audio signals, where the first domain is a time frequency spectrogram of the audio signal, and the encoded domain is an invertible transform domain (e.g., 2D FFT of the spectrogram).

Concluding Remarks

Having described and illustrated the principles of the technology with reference to specific implementations, it will be recognized that the technology can be implemented in many other, different, forms. To provide a comprehensive disclosure without unduly lengthening the specification, applicants incorporate by reference the patents and patent applications referenced above.

The methods, processes, and systems described above may be implemented in hardware, software or a combination of hardware and software. For example, the auxiliary data encoding processes may be implemented in a programmable computer or a special purpose digital circuit. Similarly, auxiliary data decoding may be implemented in software, firmware, hardware, or combinations of software, firmware and hardware. The methods and processes described above may be implemented in programs executed from a system's memory (a computer readable medium, such as an electronic, optical or magnetic storage device).

The particular combinations of elements and features in the above-detailed embodiments are exemplary only; the interchanging and substitution of these teachings with other teachings in this and the incorporated-by-reference patents/applications are also contemplated.

What is claimed is:

1. An apparatus comprising:
electronic memory configured to store a media signal representing audio or video;
an electronic processor programmed for:
extracting a reduced-bit representation of the media signal;
adapting a digital watermark embedding process with the reduced-bit representation of the media signal; and
embedding a digital watermark in the media signal with the adapted digital watermark embedding process.

2. The apparatus of claim 1, wherein the watermark embedding process embeds at least a reference signal in the media signal that is used to correct or compensate for geometric distortion.

3. The apparatus of claim 2, wherein the reduced-bit representation is used to generate the reference signal.

4. The apparatus of claim 1, wherein the reduced-bit representation comprises a hash, and the embedding uses the hash as a key to encode a reference signal in data representing the media signal.

5. The apparatus of claim 1, wherein the media signal comprises an audio signal; and wherein the reduced bit representation is used together with a key to compute the digital watermark at frequency locations within the audio signal.

6. The apparatus of claim 5, wherein the reduced bit representation and the key are used to determine magnitude of the digital watermark at the frequency locations.

7. The apparatus of claim 5, wherein the key is used to transform the digital watermark to obscure the digital watermark at the frequency locations within the audio signal.

8. The apparatus of claim 7, wherein the key is used to transform phase of the digital watermark within the audio signal.

9. The apparatus of claim 5, wherein digital watermark information is conveyed, at least in part, in the phase.

10. The apparatus of claim 9, wherein the phase is modulated with auxiliary data to convey auxiliary data in the audio signal.

11. The apparatus of claim 5, wherein the reduced bit representation comprises a sub-sampling of the audio signal.

12. The apparatus of claim 5, wherein the reduced bit representation is computed by filtering the audio signal into frequency components.

13. The apparatus of claim 5, wherein a plurality of keys are used to select the frequency location and magnitude of the digital watermark at the frequency locations.

14. The apparatus of claim 13, wherein the plurality of keys comprise a first key to select frequency location and a second key providing phase of the digital watermark.

15. The apparatus of claim 1, wherein the electronic processor is programmed for:
encoding at least first and second watermarks using corresponding keys, wherein the first watermark is encoded by inserting a signal with modulated frequency and the second watermark is encoded by inserting a signal with modulated phase.

16. An apparatus comprising:
electronic memory configured to store a media signal representing audio or video;
an electronic processor programmed for:
extracting a reduced-bit representation of the media signal;
influencing a digital watermark embedding process with the reduced-bit representation of the media signal by using the reduced-bit number to seed a pseudorandom number to generate a reference signal; and
embedding a digital watermark in the media signal, wherein the embedding embeds at least the reference signal in the media signal, wherein the reference signal provides information for correcting or compensating for geometric distortion.

17. An apparatus comprising:
electronic memory configured to store a media signal representing audio or video;
an electronic processor programmed for:
extracting data representing at least some features of the media signal;
using the extracted data as a key to select coefficients in a transform domain, wherein the coefficients represent the media signal; and
modifying selected coefficients to hide a steganographic signal in the media signal.

18. The apparatus of claim 17, wherein the key is further used to generate random phase information of a reference signal in the first transform domain, and wherein the electronic processor is programmed for embedding the reference signal in the media signal.

19. An apparatus comprising:
electronic memory configured to store a media signal comprising an auxiliary signal, the media signal comprising audio or video;
an electronic processor programmed for:
extracting data representing at least some features of the media signal;
influencing detection of the auxiliary signal with the data, wherein the data seeds a pseudorandom number generator, wherein a result of the pseudorandom number generator provides information used for detection; and
analyzing the media signal to detect the auxiliary signal with the information from the pseudorandom number generator.

20. The apparatus of claim 19, wherein the exacted data comprises media signal locations and values for the auxiliary signal.

21. The apparatus of claim 19, wherein the exacted data comprises coefficient magnitude values.

22. The apparatus of claim 19, wherein the information comprises phase data associated with the auxiliary signal.

23. An article of manufacture including a non-transitory computer-readable medium having instructions stored thereon that, if executed by a computing device, cause the computing device to perform operations comprising:
extracting a reduced-bit representation of the media signal;
adapting a digital watermark embedding process with the reduced-bit representation of the media signal; and embedding a digital watermark in the media signal with the adapted digital watermark embedding process.

24. An article of manufacture including a non-transitory computer-readable medium having instructions stored thereon that, if executed by a computing device, cause the computing device to perform operations comprising:
   extracting data representing at least some features of the media signal;
   influencing detection of the auxiliary signal with the data, wherein the data seeds a pseudorandom number generator, wherein a result of the pseudorandom number generator provides information used for detection; and
   analyzing the media signal to detect the auxiliary signal with the information from the pseudorandom number generator.

25. A method comprising:
   obtaining a media signal representing audio or video;
   extracting data associated with some features of the media signal;
   adapting a digital watermark embedding process with extracted data representing at least some features of the media signal, wherein the adapting comprises transforming a digital watermark at embedding locations according to an embedding key and at least some of the extracted data; and
   embedding, using a processor, a digital watermark in the media signal with the adapted digital watermark embedding process.

26. The method of claim 25, wherein the media signal comprises an audio signal, and the embedding locations comprise time and frequency locations within the audio signal.

27. The method of claim 26, wherein the embedding key is derived at least in part from the extracted data and the method comprises mapping the digital watermark to the media signal at the embedding locations according to the embedding key.

28. The method of claim 26, wherein the extracted data is used to generate at least a portion of the embedding key.

29. The method of claim 28, wherein the extracted data seeds a pseudorandom generator utilized for adapting the digital watermark embedding process.

30. The method of claim 29, wherein the pseudorandom generator generates an embedding signal value.

31. The method of claim 29, wherein the pseudorandom generator generates an embedding location.

32. The method of claim 26, wherein the adapted digital watermark embedding process manipulates a plural-bit digital watermark payload carried by the digital watermark.

33. The method of claim 26, wherein the adapted digital watermark embedding process transforms a plural-bit digital watermark payload carried by the digital watermark.

34. The method of claim 25, wherein the extracted data comprises a filtered version of signal attributes.

35. The method of claim 25, wherein the extracted data comprises features at time-frequency locations of the media signal.

36. The method of claim 23, wherein the extracted data comprises a hash of the media signal.

37. The method of claim 25, wherein the media signal comprise an audio signal and the extracted data comprises a sampling of the media signal at time locations within a frequency transform of the audio signal.

38. An apparatus comprising:
   electronic memory for storing an audio signal comprising an auxiliary signal hidden therein;
   an electronic processor programmed for:
      extracting data associated with features of the audio signal;
      influencing a digital watermark detection process with extracted data associated with features of the audio signal, wherein the influencing comprises adapting a decoding key for detecting a digital watermark from time-frequency locations in the audio signal from at least some of the extracted data, and
      analyzing the audio signal at the time-frequency locations to detect the auxiliary signal with the influenced digital watermark detection process.

39. The apparatus of claim 38, wherein the extracted data comprises a key.

40. The apparatus of claim 39, wherein the key is associated with a specification of audio signal magnitudes.

41. The apparatus of claim 39, wherein the key specifies auxiliary signal encoding locations within the audio signal.

42. The method of claim 39, wherein the key seeds a pseudorandom generator utilized for influencing the digital watermark detection process.

43. The method of claim 39, wherein the pseudorandom generator generates auxiliary signal location values.

44. The method of claim 39, wherein the pseudorandom generator generates auxiliary signal phase information.

45. The method of claim 38, wherein the extracted data comprises locations and signal values of the auxiliary signal.

46. The method of claim 38, further comprising decoding the auxiliary signal once detected.

47. The method of claim 46, further comprising correcting the auxiliary signal once decoded.

* * * * *

UNITED STATES PATENT AND TRADEMARK OFFICE
CERTIFICATE OF CORRECTION

| | | |
|---|---|---|
| PATENT NO. | : 8,170,273 B2 | Page 1 of 1 |
| APPLICATION NO. | : 12/768519 | |
| DATED | : May 1, 2012 | |
| INVENTOR(S) | : Sharma et al. | |

It is certified that error appears in the above-identified patent and that said Letters Patent is hereby corrected as shown below:

On Page 4, in Field (56), under "OTHER PUBLICATIONS", in Column 2, Line 35, delete "Watermaking" and insert -- Watermarking --, therefor.

On Page 4, in Field (56), under "OTHER PUBLICATIONS", in Column 2, Line 50, delete "O'Runanaidh," and insert -- O'Ruanaidh, --, therefor.

On Page 4, in Field (56), under "OTHER PUBLICATIONS", in Column 2, Line 55, delete "Watermaking" and insert -- Watermarking --, therefor.

On Page 4, in Field (56), under "OTHER PUBLICATIONS", in Column 2, Line 56, delete "Sequences.""" and insert -- Sequences," --, therefor.

In Column 6, Line 54, in Claim 20, delete "exacted" and insert -- extracted --, therefor.

In Column 6, Line 57, in Claim 21, delete "exacted" and insert -- extracted --, therefor.

In Column 8, Line 9, in Claim 36, delete "claim 23," and insert -- claim 25, --, therefor.

Signed and Sealed this
Eighteenth Day of September, 2012

David J. Kappos
*Director of the United States Patent and Trademark Office*